US010178149B2

(12) United States Patent
Pimento

(10) Patent No.: US 10,178,149 B2
(45) Date of Patent: Jan. 8, 2019

(54) ANALYSIS FOR FRAMEWORK ASSESSMENT

(71) Applicant: Adobe Systems Incorporated, San Jose, CA (US)

(72) Inventor: Jonathan Joshua Pimento, Mumbai (IN)

(73) Assignee: Adobe Inc., San Jose, CA (US)

( * ) Notice: Subject to any disclaimer, the term of this patent is extended or adjusted under 35 U.S.C. 154(b) by 456 days.

(21) Appl. No.: 14/712,588

(22) Filed: May 14, 2015

(65) Prior Publication Data

US 2016/0335332 A1 Nov. 17, 2016

(51) Int. Cl.
*H04N 1/00* (2006.01)
*G06F 17/21* (2006.01)
*G06F 17/22* (2006.01)
*G06F 17/30* (2006.01)
*G06T 11/60* (2006.01)
*H04L 29/08* (2006.01)

(52) U.S. Cl.
CPC ............ *H04L 67/02* (2013.01); *G06F 17/218* (2013.01); *G06F 17/2247* (2013.01); *G06F 17/30259* (2013.01); *G06T 11/60* (2013.01); *H04N 1/00* (2013.01)

(58) Field of Classification Search
CPC ......... G06F 17/30563; G06F 17/30011; G06F 17/30979; G06F 17/2247
See application file for complete search history.

(56) References Cited

U.S. PATENT DOCUMENTS

| | | | | |
|---|---|---|---|---|
| 5,999,664 | A * | 12/1999 | Mahoney | G06F 17/30256 382/180 |
| 6,562,077 | B2 * | 5/2003 | Bobrow | G06F 17/30011 382/306 |
| 6,665,841 | B1 * | 12/2003 | Mahoney | G06F 17/30256 707/E17.023 |
| 7,853,564 | B2 * | 12/2010 | Mierau | G06Q 30/06 707/638 |
| 7,941,384 | B2 * | 5/2011 | Gilman | G06F 17/30563 706/25 |
| 7,941,394 | B2 * | 5/2011 | Error | G06F 17/3089 707/600 |
| 8,027,542 | B2 * | 9/2011 | Ahammad | G06F 17/30781 348/699 |
| 8,402,168 | B1 * | 3/2013 | Ufimtsev | G06F 17/30902 709/218 |

(Continued)

*Primary Examiner* — Daniel A Kuddus
(74) *Attorney, Agent, or Firm* — Wolfe-SBMC

(57) ABSTRACT

Design analysis for framework assessment is described. A file including a designed image may be obtained from a storage device, and a guide structure may be extracted from the file. The guide structure may include multiple guide lines, and the guide lines may be analyzed to determine column-related data, such as at least relative widths or positional orders, a total number of columns, groups of column widths, a combination thereof, and so forth. From multiple frameworks, a framework may be ascertained that substantially matches the guide structure based at least partially on a comparison of column-related data to each framework of the multiple frameworks. Ascertainment of a framework may be indicated to an end-user. The ascertained framework may be applied to facilitate development of a coded functional version of at least a visual design of the image.

20 Claims, 13 Drawing Sheets

(56) References Cited

U.S. PATENT DOCUMENTS

| | | | | |
|---|---|---|---|---|
| 8,781,255 B2* | 7/2014 | Lin | .................... | G06F 17/30262 |
| | | | | 382/291 |
| 8,805,116 B2* | 8/2014 | Lin | .................... | G06F 17/30262 |
| | | | | 382/286 |
| 9,122,660 B2* | 9/2015 | Hebbar | .................. | G06F 17/218 |
| 9,467,750 B2* | 10/2016 | Banica | ................. | H04N 21/812 |
| 2006/0277212 A1* | 12/2006 | Error | .................... | G06F 17/3089 |
| 2007/0294612 A1* | 12/2007 | Drucker | ............ | G06F 17/30056 |
| | | | | 715/203 |
| 2008/0226174 A1* | 9/2008 | Hua | .................... | G06K 9/00228 |
| | | | | 382/190 |
| 2013/0121570 A1* | 5/2013 | Lin | .................... | G06F 17/30262 |
| | | | | 382/165 |
| 2013/0121600 A1* | 5/2013 | Lin | .................... | G06F 17/30262 |
| | | | | 382/224 |
| 2013/0124507 A1* | 5/2013 | Gartland | ........... | G06F 17/30011 |
| | | | | 707/723 |
| 2014/0033132 A1* | 1/2014 | Jain | ..................... | G06F 3/04812 |
| | | | | 715/862 |
| 2014/0359656 A1* | 12/2014 | Banica | ................. | H04N 21/812 |
| | | | | 725/32 |

* cited by examiner

212

802-1

802-2

802-3

ANALYSIS FOR FRAMEWORK ASSESSMENT

BACKGROUND

If someone wishes to convey a particular sentiment or specific information, corresponding aesthetic and communicative goals may be set forth that are expected to facilitate conveying the desired feelings and knowledge. If the feelings and knowledge are to be shared electronically, they may be conveyed using the internet, the World Wide Web (WWW), a browser, another application that adheres to WWW-related standards—such as a version of the HyperText Markup Language (HTML), or a similar technological environment. Web site creation, for example, often involves two different people or teams having different skillsets that work together to produce a finished product that is published to the WWW.

These two different teams may be referred to as designers and developers. Designers of web pages are tasked with carefully laying out a desired image in accordance with the particular sentiment or specific information that is intended to be conveyed. Designers therefore often focus on visual appeal and communicative effectiveness. In contrast, developers of web pages are challenged with the responsibility of converting designed images into a code-based, functional format that can be digested by web-compliant applications, while still maintaining the capability to convey the desired feelings and knowledge. Consequently, although developers tend to focus on functionality, developers should not lose sight of the carefully designed image that is to be presented via a web-related platform.

SUMMARY

Design analysis for framework assessment is described. In one or more example embodiments, a framework assessment module, which is implemented at least partially in hardware of a device, is configured to perform a number of operations. At least one file including an image is obtained from a storage device, with the image including a layout of visual components. A guide structure is extracted from the at least one file, with the guide structure including multiple guide lines relating to the layout of visual components. From multiple frameworks, a framework is ascertained that substantially matches the guide structure based at least partially on a comparison of the guide structure to each framework of the multiple frameworks using at least one distance between guide lines of the multiple guide lines. Ascertainment of a framework that substantially matches the guide structure is indicated to an end-user. The ascertained framework is applied to facilitate development of a coded functional version of the layout of visual components.

In one or more example embodiments, at least one file including an image is loaded from a storage device. A guide structure is extracted from the at least one loaded file, with the guide structure associated with the image. From multiple frameworks, a framework is ascertained that substantially matches the guide structure based at least partially on a comparison of the guide structure to each framework of the multiple frameworks. The ascertained framework that substantially matches the guide structure is indicated to an end-user. The end-user is enabled to accept or decline the ascertained framework. Additionally or alternatively, the ascertained framework may be applied to facilitate development of a coded functional version of at least a visual design of the image.

In one or more example embodiments, a computer-readable storage medium has stored thereon multiple instructions that, responsive to execution by one or more processors, cause the one or more processors to perform a number of operations. At least an indicator of an image is obtained. A guide structure associated with the image is obtained. Mapping the guide structure to respective frameworks of multiple frameworks is attempted using respective columnar layouts of multiple columnar layouts. A result of the attempt is reported to an end-user. If the attempt is successful, a development workspace is prepared using a framework that maps to the guide structure.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is presented with reference to the accompanying figures. In the figures, the left-most digit or two digits of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIGS. 11-1 and 11-2 are flow charts illustrating example processes in accordance with one or more example embodiments.

DETAILED DESCRIPTION

Overview

Figure 1:
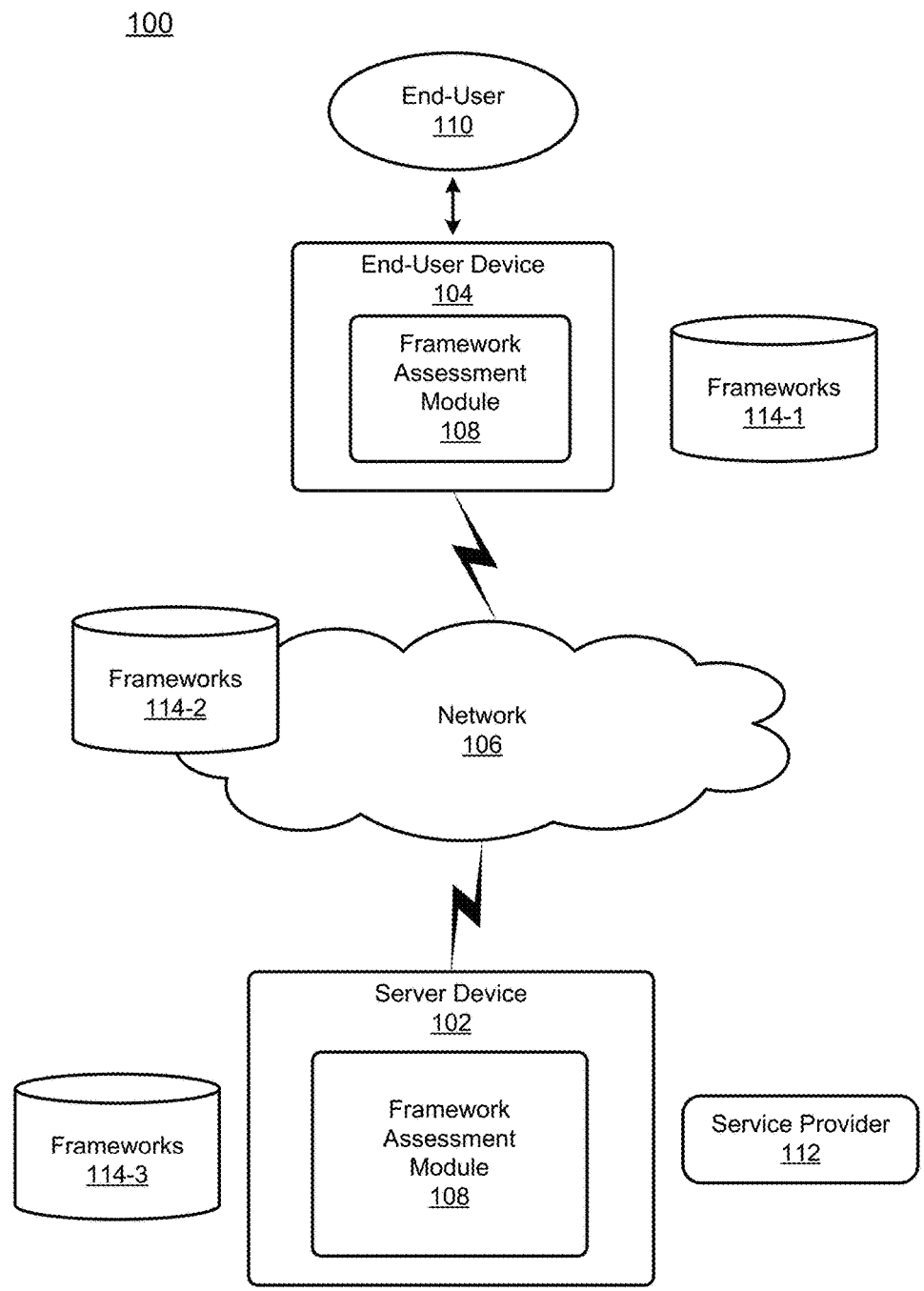
FIG. 1 is an illustration of an environment for example embodiments that are operable to employ techniques described herein that relate to design analysis for framework assessment.

As discussed above, production of web pages often involves two different skillsets—those of a designer and those of a developer. A designer usually relies on artistic and marketing skills to craft an image that conveys intended knowledge with a prescribed level of emotional impact. A developer, on the other hand, typically relies more on logic and coding skills to transform a designed image into a functional product that can be rendered properly using different applications on a multitude of devices. Each application, even if ostensibly or mostly compliant with one or more web-related standards, may interpret or render a given piece of code differently. Moreover, various end-user devices may have different physical form factors, different screen resolutions, different usage cases, different processing or rendering capabilities, or other differences that impact how a coded functional file can or will be presented to a user.

Although a goal of a developer may be to replicate an image received from a designer as accurately, completely, or faithfully as is reasonable, different application features or different device capabilities may frustrate this goal. One approach by a developer to efficiently facilitating a transformation from a designed image to a coded functional file is to use a framework to produce code for the functional file. A framework may comprise a set of code or software, which is usually publicly-accessible, that can be leveraged by a developer to produce a standards-compliant (e.g., web-ready) code product. Frameworks may interrelate with one or more programming technologies, such as, by way of example but not limitation, HTML, JavaScript (JS), Cascading Style Sheets (CSS), or a combination thereof.

In an attempt to accommodate different programming technologies or the aforementioned varieties of applications and end-user devices, as well as a myriad of potential image designs, numerous frameworks have been created. Furthermore, each framework of the numerous frameworks may have different implementations, options, capabilities, and so forth. Selecting a framework that is appropriate for a given designed image may consequently be both difficult and time consuming.

For one or more example embodiments, a designed image is part of a document and has a guide structure including multiple vertical guide lines used by a designer to facilitate the laying out of components of an image. The guide structure is extracted from the document of the designed image and analyzed. Analysis of a guide structure may include, by way of example but not limitation, determining a width of the image, enumerating a number of guide lines, determining a number of columns that relates to the number of guide lines, determining at least a relative distance between adjacent guide lines (e.g., a number of pixels or a percentage of a total width), organizing distances between adjacent guide lines into groups, or a combination thereof in order to produce a layout for the designed image. Layouts of a designed image may include, by way of example but not limitation, a columnar layout, a row layout, or a combination thereof.

To identify an appropriate framework, an extracted or analyzed guide structure of the designed image is compared to individual ones of multiple frameworks. More specifically, an image layout, such as a columnar layout, that is determined from analysis of the extracted guide structure may be compared to layouts, such as columnar layouts, associated with individual frameworks of the multiple frameworks. The columnar layouts of the multiple frameworks may comprise (i) one or more grids or grid blueprints or (ii) a description of column characteristics of the multiple frameworks. A match may be based on one or more of the following factors: number of columns, relative widths of columns (e.g., in percentages), relative positional order of columns of different widths, absolute widths (e.g., in millimeters or pixels), widths or locations of guard zones, other available traits or features—such as column nesting, and so forth. If a framework is ascertained to substantially match the extracted guide structure of the designed image, the matching framework may be indicated to a developer or automatically incorporated into a development process. For instance, a name of the matching framework may be displayed to the developer, or the developer may be provided an opportunity to have the matching framework be loaded for use in production of a coded functional version, such as a web-compliant version, of at least a visual representation of the designed image.

In the following discussion, after some example terminology is set forth, an example environment is described that may employ the techniques described herein. Example embodiment systems, details, and procedures are then described which may be performed in the example environment as well as in other environments. Consequently, performance of the example procedures is not limited to the example environment, and the example environment and systems are not limited to performance of the example procedures.

Terminology Examples

In one or more example embodiments, the term "file," as used herein, refers to a container of data, or portion thereof, that may be transferred between programs or machines or that may persist after a program terminates or a machine is turned off. At least one file may include an image and an associated guide structure. The image and the guide structure may be integrated with, or separate from, each other. Examples of files may include, but are not limited to, a portion of a web site such as a web page, an Adobe® Photoshop® document such as a PSB or PSD file, an Adobe Illustrator® document such as an AI file, a PDF or JPEG file, or combination thereof.

In one or more example embodiments, the term "image," as used herein, refers to one or more visual components or to a layout of visual components that are intended to be presented to a person via a screen, a projection, a print-out, a combination thereof, and so forth. An image may be integrated with, may be designed on top of or over, may be designed using, may be linked to, or may otherwise be associated with a guide structure; similarly, a guide structure may be integrated with, may be embedded within, may be used to design, may be linked to, or may otherwise be associated with an image. In one or more example embodiments, the term "visual components," as used herein, refers to separate or at least partially merged aspects that are discernable by a human eye. Examples of visual components may include, but are not limited to, a static picture, a video, a GIF, a textual block, a textual flow, text annotating another component, a graphic banner, a button or block serving as a hyperlink, a menu bar, a background picture, a column header, an advertisement, a title area, a block for embedded content—such as from a microblogging or image sharing or social network service, or some combination thereof.

In one or more example embodiments, the term "guide structure," as used herein, refers to a layout or set of guide indicators that facilitate an orderly placement of visual components or that reflect an intended presentation of visual components. A guide structure may include one or more guide lines. In one or more example embodiments, the term "guide lines," as used herein, refers to multiple lines that may be used by a designer of an image to place visual components or that may indicate where visual components are intended to be presented with respect to an edge of an image or with respect to other visual components. Guide lines may be parallel lines and may be vertically or horizontally oriented.

In one or more example embodiments, the term "framework," as used herein, (i) refers to a publicized or standardized set of code or software that can be leveraged by a developer to produce a coded functional version of at least visual components of a designed image or (ii) a description of one or more characteristics for such a publicized or standardized set of code or software, depending on context. A resulting programming product may be compliant with one or more web-related standards. For example, frameworks may interrelate with one or more programming technologies, such as HTML, JS, CSS, a combination thereof, and so forth. Examples of frameworks may include, but are not limited to, Bootstrap, Foundation, and Cascade.

In one or more example embodiments, the term "columnar layout," as used herein, refers to at least relative widths between or among columns or to relative positioning of columns with respect to one another. A columnar layout or characteristic description thereof may include, by way of example but not limitation, a document or container width, a number of columns, a width of content columns, a width of gutter columns or guard zones, or combination thereof. A columnar layout of a guide structure of a designed image may depend at least partially on a layout or spacing of multiple guide lines. A columnar layout of a framework may depend at least partially on a column number, a column width, a gutter width, a grid blueprint, some combination thereof, or so forth. In one or more example embodiments, the term "column," as used herein, refers to (i) a vertical area of a designed image that is defined at least partially by a guide structure or (ii) a predetermined width or grid area of a standardized framework. A "column" may refer to a vertical area that is allocated for content, a vertical area that is allocated as a guard zone or gutter, a component or visual-related column, an underlying column, a combination thereof, and so forth. Examples of a visual-related column width versus an underlying column width are discussed herein below with particular reference to FIGS. 7 and 8.

In one or more example embodiments, the term "coded," as used herein, refers to program product that is processor-executable, including but not limited to code or script. Examples of program product may include, but are not limited to, HTML, JS, CSS, or a combination thereof. In one or more example embodiments, the term "functional," as used herein, refers to program product that may be implemented in an adaptable fashion to enable person-perceptible presentation using different devices, different display technologies or form factors, different programs such as different applications or browsers, active content selection—such as that which varies by user or geospatial location or stored cookies, a display that changes over time, some combination thereof, and so forth.

Also, unless context dictates otherwise, use herein of the word "or" may be considered use of an "inclusive or," or a term that permits inclusion or application of one or more items that are linked by the word "or" (e.g., a phrase "A or B" may be interpreted as permitting or being relevant to just "A," to just "B," or to both "A" and "B").

Example Environment

FIG. 1 is an illustration of an environment 100 for one or more example embodiments that are operable to employ techniques described herein that relate to design analysis for framework assessment. As illustrated, example environment 100 includes at least one server device 102, at least one end-user device 104, at least one network 106, at least one end-user 110, at least one service provider 112, and one or more frameworks 114. More specifically, three collections of frameworks 114-1, 114-2, and 114-3 are shown, but more or fewer than three may alternatively be part of environment 100. Server device 102 or end-user device 104 may include at least one framework assessment module 108.

For one or more example embodiments, a framework assessment module 108 analyzes an image or a file thereof (not explicitly shown in FIG. 1) in order to assess which framework 114 matches a guide structure of the image. Hence, framework assessment module 108 may at least partially implement one or more techniques or systems as described herein for design analysis for framework assessment. A framework assessment module 108 may be located at, or executing on, server device 102, end-user device 104, a combination thereof, and so forth.

An end-user 110 may be associated with an end-user device 104. A service provider 112 may be associated with a server device 102. End-user device 104 may be in communication with server device 102, or vice versa, via at least one network 106. Network 106 may comprise at least a portion of one or more network types. Network types may include, but are not limited to, a public network, a private network, the internet, the web, an Ethernet, an intranet, an extranet, a wireless network, a wired network, a cellular network, an infrastructure network, an ad hoc network, a Bluetooth network, a Wi-Fi network, an LTE network, a PSTN, or some combination thereof.

An end-user 110, such as a web developer, may work on transforming a designed image into a coded functional file that is suitable for rendering by a program that is compliant with one or more web-related standards using end-user device 104. An end-user device 104 may comprise or may be configured as any suitable type of computing device. Examples of end-user devices 104 include, but are not limited to, a desktop computer, a laptop computer, a mobile device (e.g., assuming a handheld configuration such as a tablet, a mobile phone, a phablet, etc.), a mobile device coupled to a separate screen, an entertainment appliance such as a smart television, a game console, a device configured to receive gesture input, a device configured to receive speech or video input, a device configured to provide 2D or 3D image output, a device configured to provide sound output, a wearable computing device such as a smart watch or intelligent glasses, or some combination thereof. Thus, an end-user device 104 may range from relatively high-resource devices with substantial memory and processor resources (e.g., personal computers or game consoles) to relatively low-resource devices with constrained memory or processing resources (e.g., mobile devices such as wearables). At end-user device 104, a framework assessment module 108 may be a standalone application, may be included as part of another application, may be a portion of a web development application, may comprise native code, may comprise run-anywhere code, may be a downloaded application or applet, may be some combination thereof, and so forth.

Additionally or alternatively, framework assessment for an analyzed image design may be offered by a service provider 112. For environment 100, a service provider 112 may be associated with a server device 102 or with framework assessment module 108 to facilitate, e.g., web development with one or more frameworks 114 via network 106, such as at least the Internet. This example scenario may be considered a "cloud-based" computing environment. Generally, a service provider 112 may be configured to make various development resources available over network 106 for end-user 110. In some situations, an end-user 110 that wishes to develop web sites or content powered by web standards may subscribe to a service that provides access to framework assessment module 108 at server device 102 or to a web application that executes at least partially on a client device, such as end-user device 104.

A service provider 112 may be associated with (e.g., own, lease, manage, etc.) server device 102 and cause to be executed framework assessment module 108. Server device 102 may be configured to facilitate design analysis for framework assessment, as a so-called cloud service for example, over at least one network 106. Server device 102 may comprise, for example, a web server, a server running open source software, a server of a proprietary design, a stand-alone server, a server blade, an allocated portion of a server farm, distributed server functionality across at least one data center, some combination thereof, and so forth. Although a single server device 102 is explicitly shown in FIG. 1, a server device 102 may be representative of a plurality of different devices or distributed computing resources that interoperate or coordinate to perform operations "over the cloud" or "in the cloud" as is known.

For one or more example embodiments, a framework assessment module 108 represents functionality to implement techniques for design analysis for framework assessment as described herein. Framework assessment module 108 may suggest or automatically select for utilization a framework of frameworks 114 that matches a designed image to facilitate development of a corresponding coded functional file for rendering the image with different applications or devices. A collection of frameworks 114 includes at least a description of multiple frameworks with the description encapsulating at least one or more column-related characteristics. Frameworks 114 may be realized as at least one file, as a database or portion thereof, as a set of linked data structures, a combination thereof, and so forth.

Frameworks 114 may be part of or separate from a framework assessment module 108. Frameworks 114 may be located or stored at any one or more of a number of different places. Example places of location or storage include, but are not limited to, end-user device 104 (e.g., frameworks 114-1 that is part of or separate from a framework assessment module 108 of end-user device 104), server device 102 (e.g., frameworks 114-3 that is part of or separate from a framework assessment module 108 of server device 102), network 106 (e.g., frameworks 114-2 that is amalgamated at one location or distributed across multiple network locations), or some combination thereof. Any given instantiation of framework assessment module 108 may be configured to access any one or more of frameworks 114-1, frameworks 114-2, frameworks 114-3, and so forth.

A framework assessment module 108 may be implemented as a software package, a hardware device, or using a combination of software, hardware, firmware, fixed logic circuitry, and so forth. A framework assessment module 108 may be implemented as a standalone component of a device 102 or 104 as illustrated in FIG. 1. Additionally or alternatively, a framework assessment module 108 may be configured as a component of another application, as a component of an operating system of a device on which it is executing (e.g., a server device 102 or an end-user device 104), as a plug-in module, as a standalone service or as a service integrated with other services, as another device application or functionality, as a library available to another program, as an application programming interface (API) available to another program, or a combination thereof, and so forth.

Having considered an example environment, consider now a discussion of some example details of the systems or techniques for design analysis for framework assessment in accordance with one or more embodiments.

Design Analysis for Framework Assessment

Figure 2:
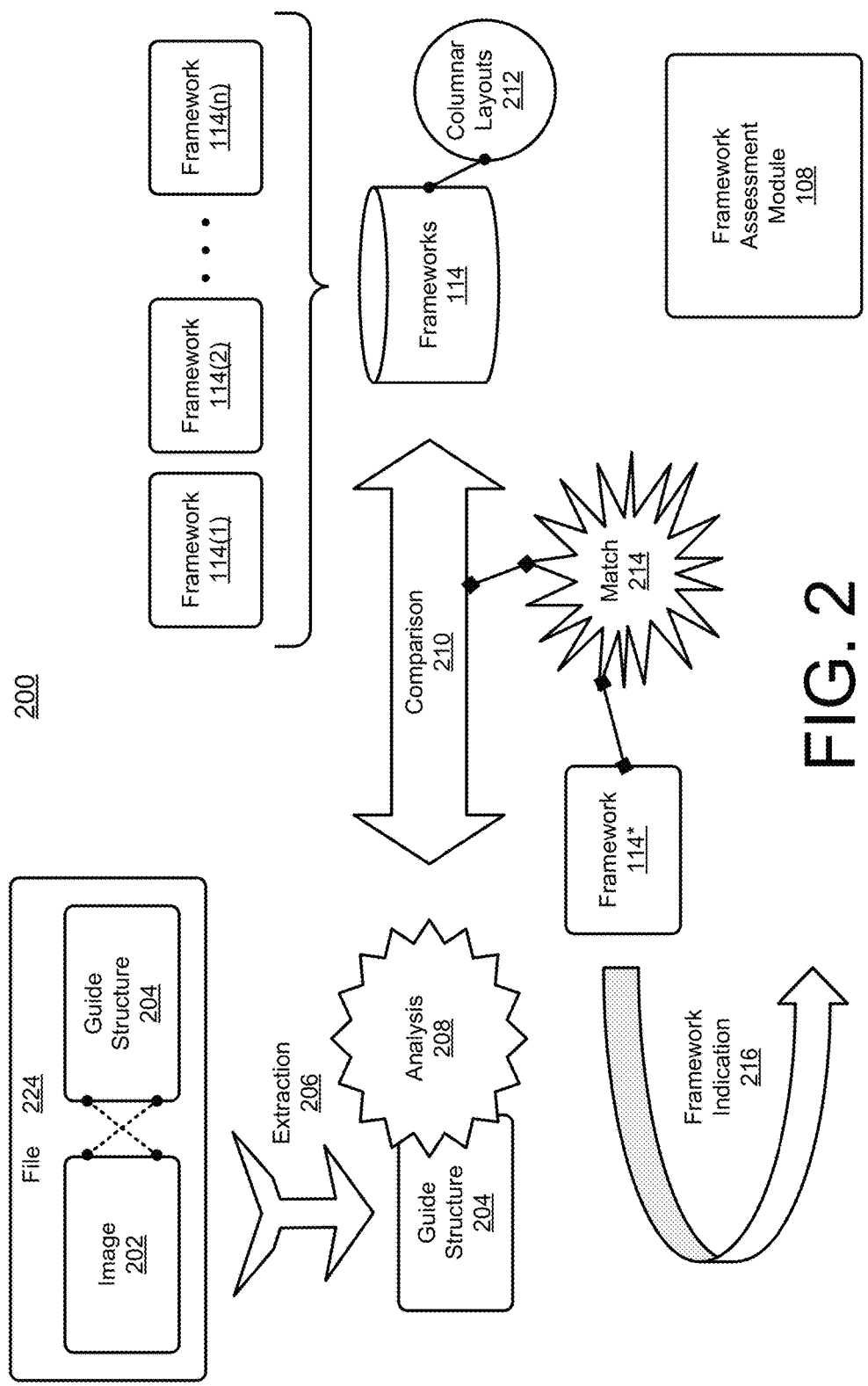
FIG. 2 shows example aspects of a technique for design analysis for framework assessment in accordance with one or more example embodiments.

This section describes some example systems or details of design analysis for framework assessment in accordance with one or more embodiments. FIG. 2 shows example aspects of a technique 200 for design analysis for framework assessment in accordance with one or more example embodiments. As illustrated, example technique 200 includes a file 224 that includes an image 202 or a guide structure 204, an extraction operation 206, an analysis operation 208, a comparison operation 210, multiple frameworks 114, multiple columnar layouts 212, a match status 214, an ascertained or matching framework 114*, and a framework indication 216. A framework assessment module 108 may implement at least a portion of technique 200.

For one or more example embodiments, a framework assessment module 108 has access to multiple frameworks 114 to enable the finding of a framework match for at least one file 224 or an image 202 thereof based on a guide structure 204. File 224 may contain or otherwise comprise an image 202 or a guide structure 204, with image 202 and guide structure 204 being separate or integrated with one another. Image 202 may be embedded in, may have integrated within, may have embedded in, may be linked to, or may otherwise be associated with at least one guide structure 204. Guide structure 204 may include multiple horizontal guide lines or multiple vertical guide lines. An example of a guide structure 204 is described herein below with particular reference to at least FIGS. 3 and 7.

Figure 3:
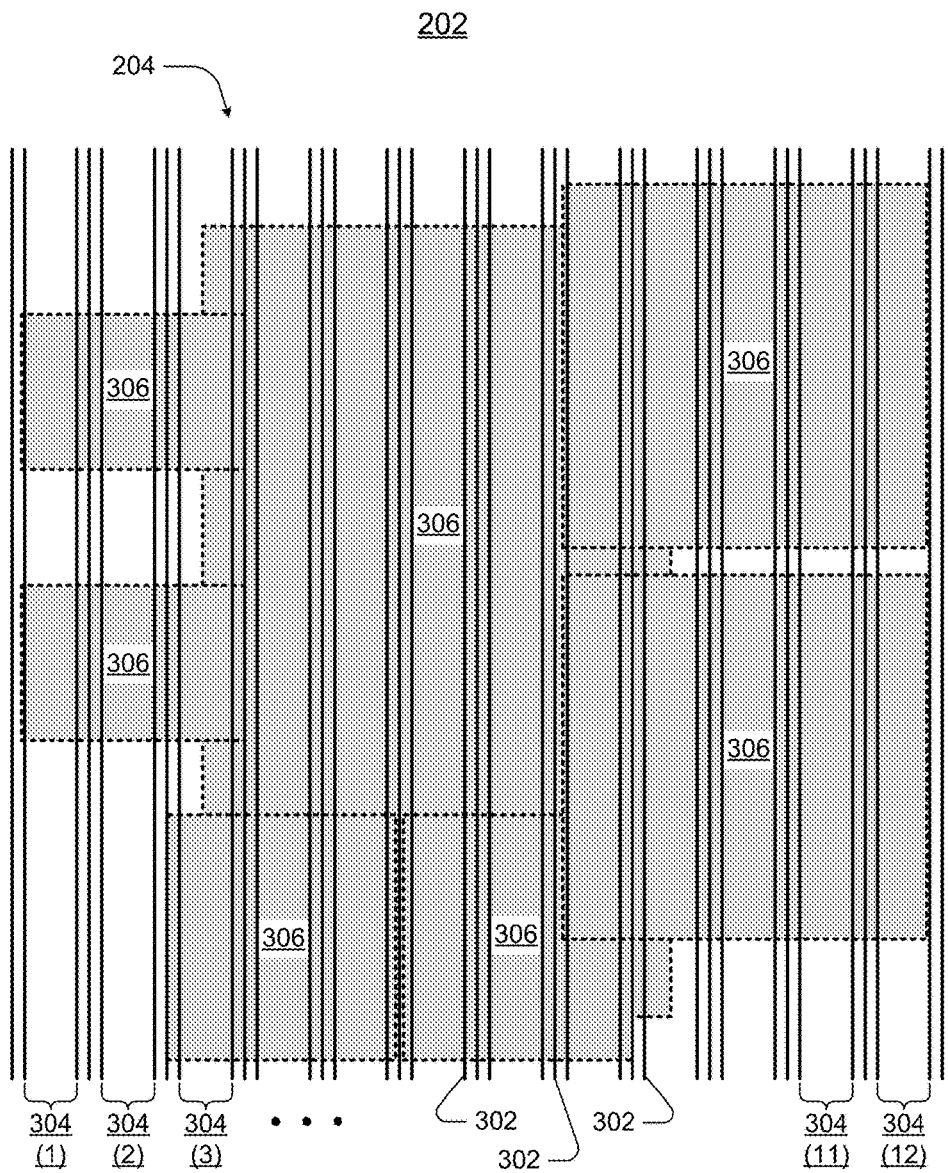
FIG. 3 depicts an example of a designed image having a guide structure in accordance with one or more example embodiments.
Figure 7:
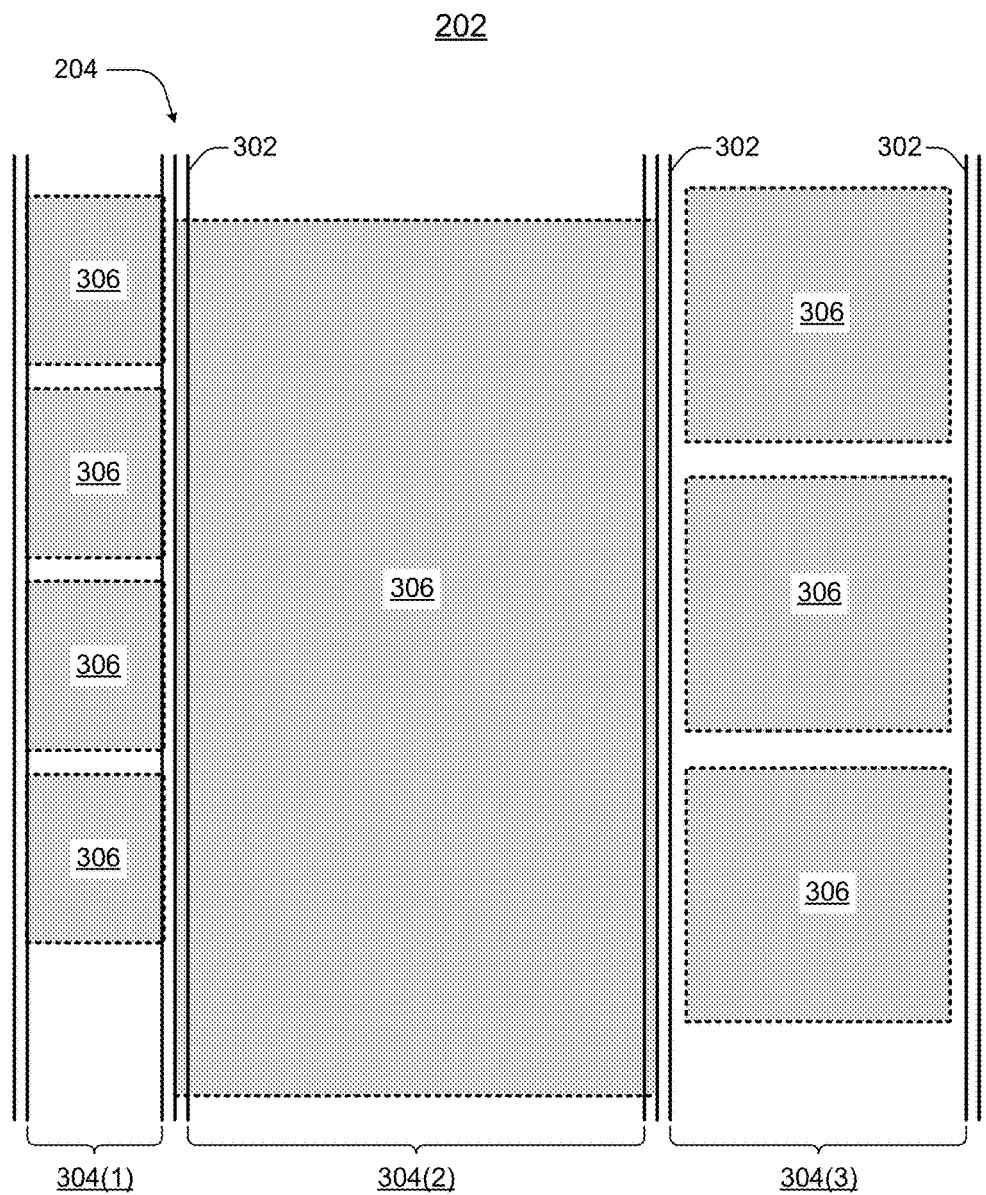
FIG. 7 depicts another example of a designed image having an alternative guide structure in accordance with one or more example embodiments.

An extraction operation 206, by way of example but not limitation, may extricate guide structure 204 from file 224, may isolate guide structure 204 from image 202, may process image 202 such that guide structure 204 may be analyzed independently from visual design components of image 202, or some combination thereof. Examples of visual design components are shown in FIGS. 3 and 7 as components 306 of an image 202. An analysis operation 208 may process guide structure 204 to determine an overall image width, to determine a total number of guide lines, to determine a distance between pairs of adjacent guide lines, to determine groups of similar distances or identify sets of columns, a combination thereof, and so forth. From analysis operation 208, a layout of columns for guide structure 204 may be determined. An encapsulated representation of a layout of columns of guide structure 204 is also referred to herein as a columnar layout (e.g., a columnar layout 412 that is described herein below with particular reference to FIG. 4)

A collection of frameworks 114, such as a those stored in a database, may be stored as part of or otherwise accessible to framework assessment module 108. For example, a framework 114(1), a framework 114(2) . . . a framework 114(n) may be included as part of a collection of frameworks 114, with "n" representing a positive integer of two or greater. Each framework 114, for purposes of comparison operation 210, may comprise at least a description of framework 114. A description of a framework may include, by way of example but not limitation, a name of the framework, columnar layout 212 (e.g., container width, number of columns, column width, or gutter width), grid behavior, enabled capabilities (e.g., nestable, offsets, or column ordering), or a combination thereof, such as a columnar layout 212 that includes a description of characteristics of a grid blueprint. Examples of grid blueprints are described herein below with particular reference to at least FIG. 8.

For one or more example embodiments, comparison operation 210 comprises comparing respective columnar layouts 212 of respective frameworks 114 to a layout of columns of guide structure 204 that is determined via analysis operation 208. As a result of comparison operation 210, a matching framework 114\* may be ascertained. A match status 214 may arise if a framework 114 is ascertained that may be used to develop a coded functional file (e.g., that is web-compliant) to reproduce at least a visual representation of image 202. If a matching framework 114\* is ascertained, a framework indication 216 may be presented to an end-user. For example, a name of the ascertained framework 114\* may be displayed to a developer along with an ability to select the ascertained framework 114\* to begin development of, e.g., a web page in accordance with a design of image 202.

FIG. 3 depicts an example of a designed image 202 having a guide structure 204 in accordance with one or more example embodiments. As illustrated, designed image 202 includes a guide structure 204, multiple guide lines 302, multiple columns 304, and multiple visual components 306. More specifically, but by way of example only, designed image 202 includes 12 columns 304(1), 304(2), 304(3) . . . 304(11), 304(12). Generally, an image 202 may be divided into "m" columns, with "m" representing a positive integer.

For one or more example embodiments, a designer may create an image 202 around or using multiple guide lines 302 to facilitate an attractive or orderly arrangement of visual components 306. A designer may be empowered to place guide lines 302 to form one or more columns 304 as part of guide structure 204. Guide lines 302 help a designer to place items into an aesthetically-pleasing layout of components 306, e.g., that adequately separates different components but still juxtaposes related items. Components 306 may include, by way of example but not limitation, a text block, an advertisement header, a title area, a vertical listing of site links—such as a partial site map, a vertical listing of advertisements, a comments section, a picture, a video, a GIF, a caption, an area for tabs, a navigational area, or a combination thereof.

For one or more example embodiments, guide lines 302 are vertically oriented. However, at least some guide lines 302 may additionally or alternatively be oriented horizontally. For example image 202 as shown in FIG. 3, guide structure 204 includes 12 columns 304(1 . . . 12) (e.g., columns that are allocated for content), with each column 304 having an associated guard zone on the left and on the right side of the column. However, a guide structure 204 may have a different total number of columns, such as 5, 8, 14, 16, and so forth.

Figure 4:
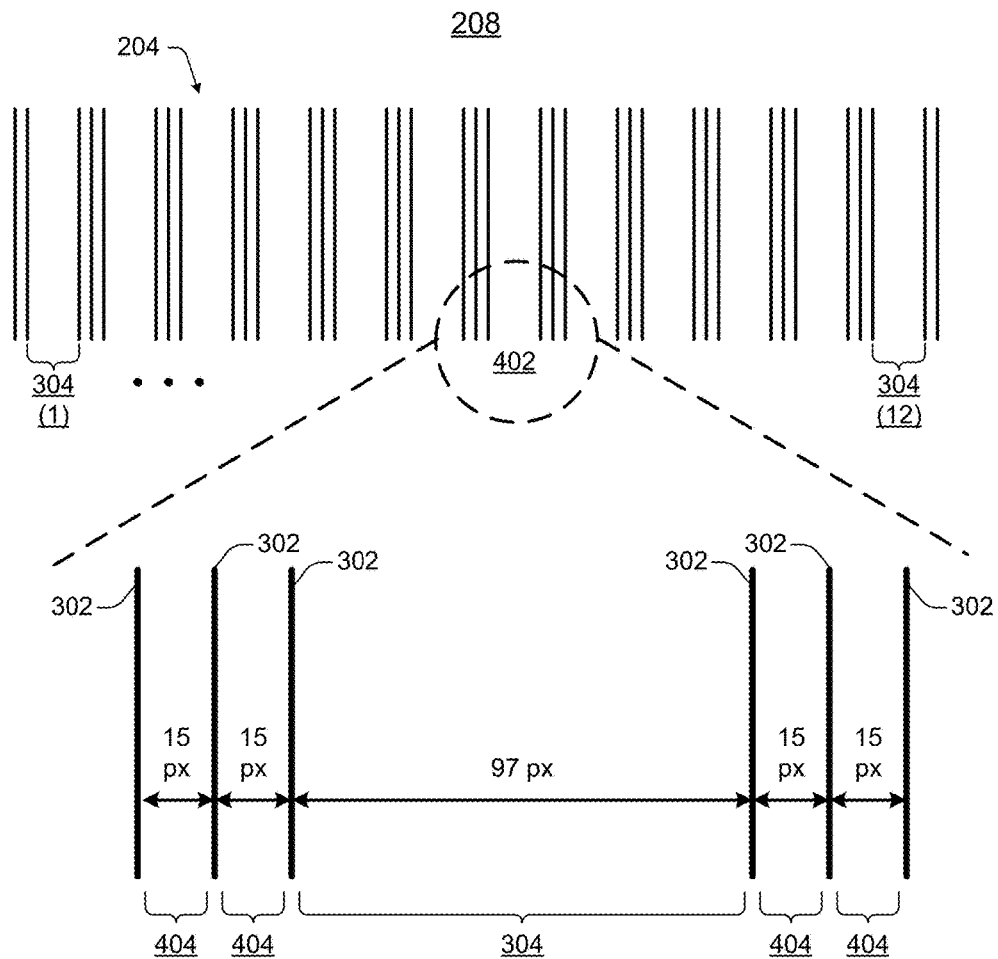
FIG. 4 shows at least a portion of an example analysis operation of a guide structure of a designed image in accordance with one or more example embodiments.

FIG. 4 shows at least a portion of an example analysis operation 208 of a guide structure 204 of a designed image in accordance with one or more example embodiments. As illustrated, analysis operation 208 is directed to a guide structure 204 including multiple columns 304(1 . . . 12). A portion 402 of guide structure 204 is enlarged to show details of spacing between guide lines 302. Enlarged portion 402 depicts a column 304 and multiple guard zones 404, as well as pixel (px) counts for each spacing. FIG. 4 also illustrates an example columnar layout 412 that may be produced as part of analysis operation 208 as an encapsulated representation of a layout of columns of guide structure 204.

For one or more example embodiments, a columnar layout 412 includes one or more of the following individually or in combination: a total width of an image or container, a total number of columns 304 (e.g., content-related columns), at least relative widths of columns 304, at least relative widths of guard zones 404, relative positional order of different columns 304 (e.g., if columns 304 have different widths), nested columns, spaced-apart columns, empty columns, and so forth. To produce a columnar layout 412, a width or distance between two adjacent or consecutive guide lines 302 may be determined. Hence, a width of guard zone 404 or a width of column 304 may be determined by calculating a distance between two adjacent guide lines 302 that form the guard zone or the column. An individual guard zone 404 or a pair of adjacent guard zones 404 may be considered a gutter area on either side of a column 304. As shown, distances or widths are expressed in units of pixels, but a different unit may be used. Examples of units may include, but are not limited to, points, em (e.g., a flexible scaling mechanism that may size things based on location or relative to an adjustable value), pixels, millimeters (mm) or inches, percentage, or a combination thereof. Generally, at least relative distances between different pairs of adjacent guide lines 302 may be determined to produce a columnar layout 412, with "absolute" units such as pixels also effectively providing a relative indication in conjunction with pixel counts of other columns or an overall image width.

As shown for a specific numerical example, guard zones 404 have a width of 15 pixels, and columns 304 have a width of 97 pixels. Columnar layout 412 reflects an overall image or container width of 1170 pixels and distances between adjacent guides of 97 pixels and 15 pixels. These distances may be grouped by counting across guide structure 204. For a group of widths having 97 pixels, there are 12 occurrences. For a group of widths having 15 pixels, there are 24 occurrences.

Figure 5:
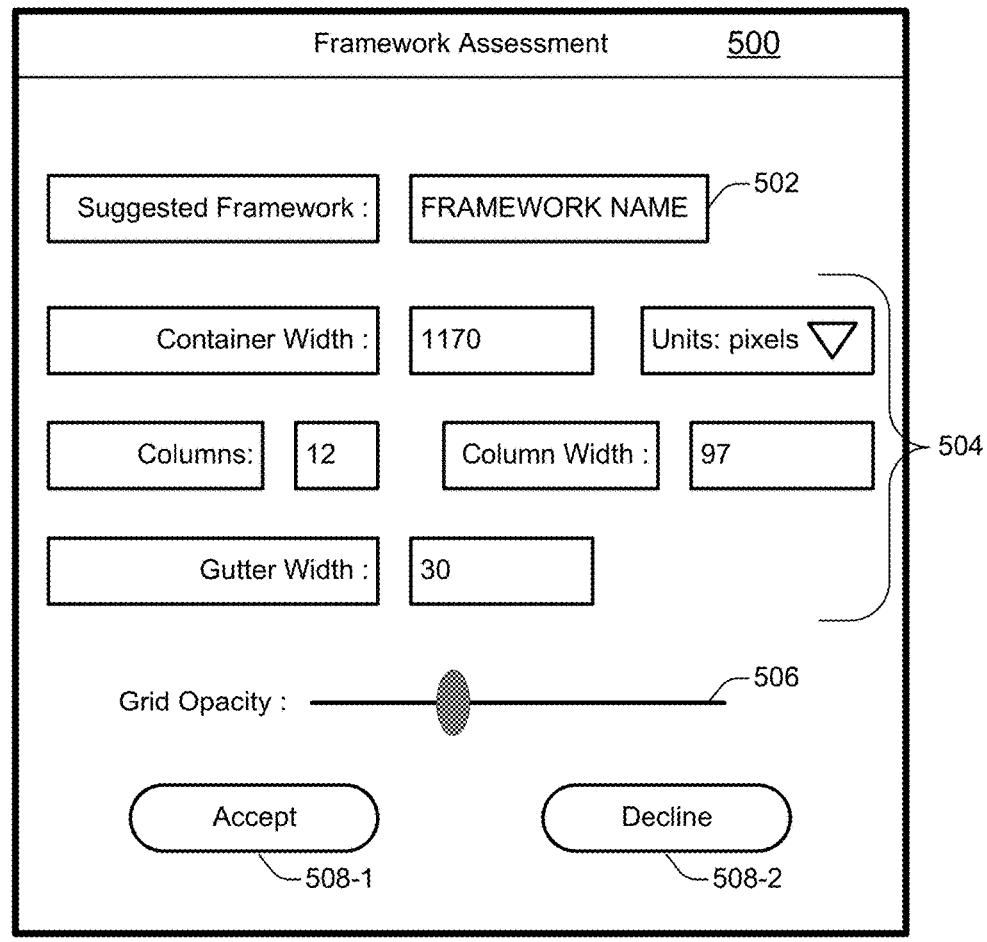
FIG. 5 depicts a framework indication in accordance with one or more example embodiments.

FIG. 5 depicts a framework indication in accordance with one or more example embodiments. As illustrated, a framework indication (e.g., an example of a framework indication 216 of at least FIG. 2) is realized as a framework assessment window 500. For one or more example embodiments, an end-user may be empowered to elect to use a suggested framework for developing a coded functional version (e.g., a web-compliant coded version) of a designed image. At 502, a suggested framework may be indicated by name (e.g., "FRAMEWORK NAME"), with the suggested framework having been ascertained to have a match status 214 (e.g., of at least FIG. 2). At 504, multiple characteristics of a columnar layout 212 (e.g., of at least FIG. 2) for the suggested "FRAMEWORK NAME" may be displayed for review by an end-user. Example characteristics of a columnar layout may include, but are not limited to, a container width (e.g., 1170 pixels), a number of columns (e.g., 12), a column width (e.g., 97 pixels), a gutter width (e.g., 30 pixels), and so forth.

The units (e.g., "pixels") for width or distance may be displayed or may be user selectable, such as with a drop-down menu as represented by a downward-pointing arrow.

Figure 6:
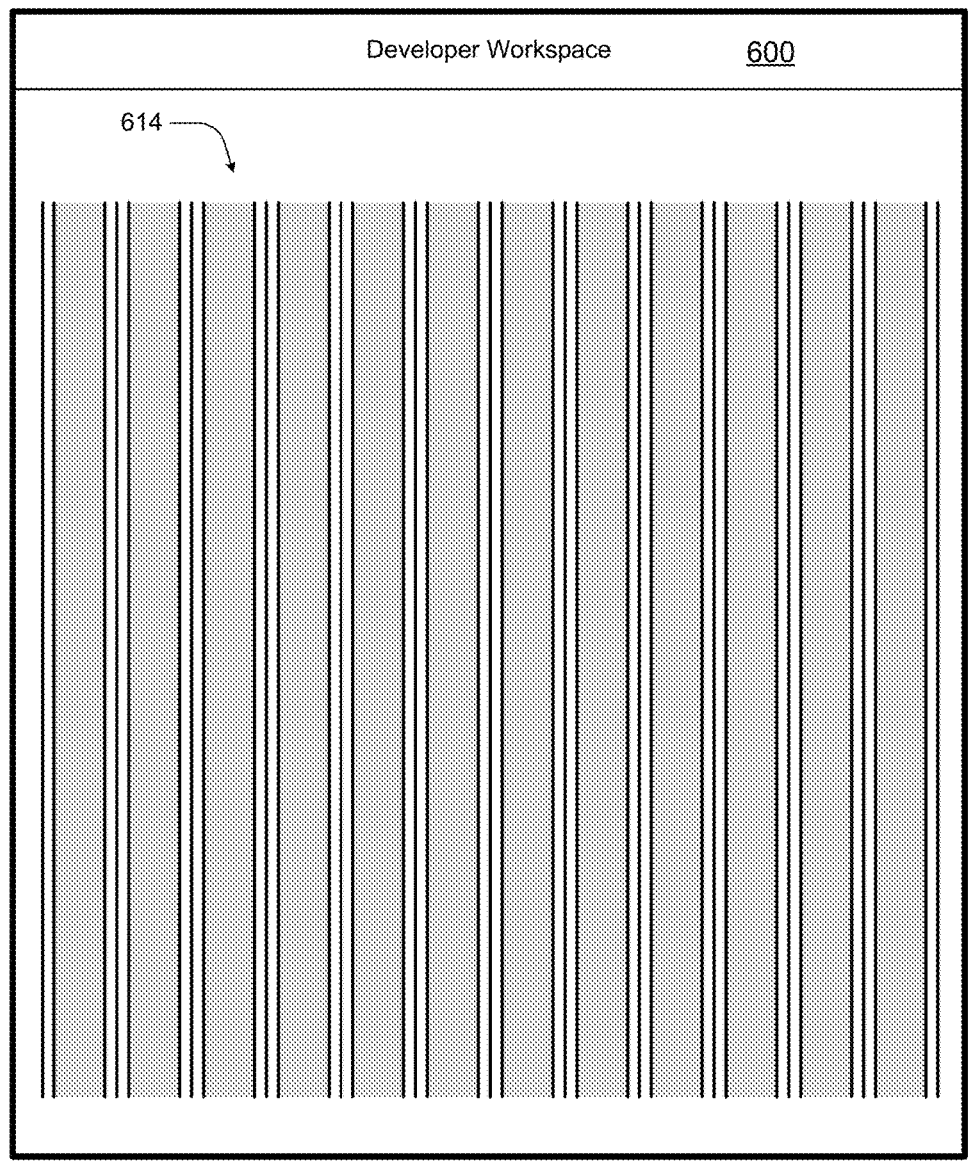
FIG. 6 depicts a visual representation of a framework that may be employed to produce a coded functional file in accordance with one or more example embodiments.
Figure 8:
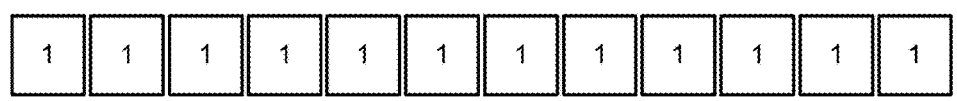
FIG. 8 illustrates multiple grid blueprint examples of at least one framework in accordance with one or more example embodiments.
Figure 8:
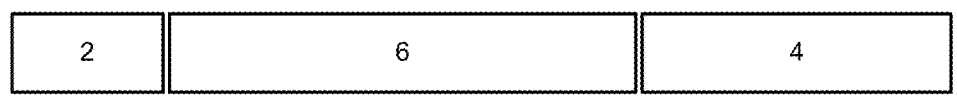
Figure 8:

An end-user, such as a developer, may elect to accept a suggested framework with an "Accept" (or "OK") button 508-1 or may elect to decline a suggested framework with a "Decline" (or "Cancel") button 508-2. If an end-user intends to accept a suggested framework, an opacity of a displayed grid for an accepted framework may be adjusted with slider 506. An example of a framework with shaded columns is shown in FIG. 6. Examples of different grid blueprints are shown in FIG. 8.

For one or more example embodiments, a framework indication 216 (e.g., of at least FIG. 2) may be implicit or explicit. Framework assessment 500 is an example of an explicit framework indication 216 in which an end-user is given an option to accept or decline a suggested matching framework 114*. Alternatively, an end-user may be presented with an implicit indication of a matching framework 114*. For instance, a development workspace may be prepared using a matching framework 114* without identifying by name or without describing the matching framework.

For one or more example embodiments, application (e.g., development utilization, installation for coding, display in a workspace environment, or a combination thereof) of a matching framework 114* may be automatic or may be dependent on user input. For instance, a matching framework 114* may be applied in response to user acceptance of a suggested framework 114 as part of a framework indication 216. Alternatively, a development workspace may be automatically prepared using a matching framework 114*, with the workspace prepared to facilitate development of a coded, functional version of an image having an associated guide structure that is mapped to the matching framework 114*. Other examples include, but are not limited to, automatically altering a user interface (UI) or a tooling of a product based on a matching framework 114*, automatically creating a new document for an end-user based on a matching framework 114*, or some combination thereof.

FIG. 6 depicts a visual representation 614 of a framework that may be employed to produce a coded functional file in accordance with one or more example embodiments. As illustrated, a developer workspace window 600 provides an area, such as a graphical user interface (GUI) area, for a developer to transform a designed image into a coded functional file, e.g., for a web page. For one or more example embodiments, developer workspace window 600 is prepared for a developer by displaying a visual representation 614 of a framework 114* (e.g., of at least FIG. 2) that has been ascertained to match a designed image. Visual representation 614 of a framework may include shaded columns or lines having an opacity set by default or set in response to end-user input, such as via a slider 506 (e.g., of at least FIG. 5).

FIG. 7 depicts another example of a designed image 202 having an alternative guide structure 204 in accordance with one or more example embodiments. As illustrated, image 202 includes multiple components 306 and a guide structure 204 having multiple guide lines 302. Guide structure 204 includes multiple columns 304. Specifically, guide structure 204 in FIG. 7 includes three columns 304(1), 304(2), and 304(3). However, more or fewer than three columns 304 may be present.

For one or more embodiments, component-related or visual-related columns 304 have different widths. However, a columnar layout may nevertheless have a number of underlying columns with equal-sized widths. For example, guide structure 204 of FIG. 7 may have 12 underlying columns of equal widths like guide structure 204 of FIGS. 3 and 4. This is determinable from the relative widths of the columns with respect to each other or with respect to a sum of column widths. For instance, as shown, column 304(1) has a width that is 2/12 a total width of a guide structure 204, column 304(2) has a width that is 6/12 a total width, and column 304(3) has a width that is 4/12 a total width. These relative widths may be mapped to a framework having 12 underlying columns with a grid blueprint of 2/6/4.

FIG. 8 illustrates multiple grid blueprint examples of at least one framework in accordance with one or more example embodiments. An example columnar layout 212 having 12 columns is shown. For one or more example embodiments, different grid blueprint 802 options for a columnar layout 212 may be included as part of a framework 114 (e.g., of at least FIGS. 1, 2, and 6). Three example grid blueprints 802-1, 802-2, and 802-3 are shown, but more or fewer than three grid blueprints may be included as part of a particular framework 114.

Grid blueprint 802-1 includes 12 grid columns with each having a width of one ("1") underlying column. Grid blueprint 802-2 includes three grid columns having a width of two ("2"), six ("6"), and four ("4") underlying columns. Grid blueprint 802-2 may be matched to guide structure 204 of FIG. 7, for example. Grid blueprint 802-3 includes two grid columns having a width of five ("5") and seven ("7") underlying columns. Grid blueprints 802 may have a different combination, permutation, or ordering of columns at different widths of underlying columns than those that are shown in FIG. 8. A columnar layout 212 of a framework 114 may also have a different number of underlying columns than the 12 that are shown. Furthermore, grids may be nested for a given framework 114. For example, for a bi-level nesting arrangement, a row may be included inside a set of eight columns or a two-thirds width of an upper grid level such that a 12 column layout of a nested lower grid level is squeezed into the two-thirds width of the upper grid level.

Having discussed example systems and details of techniques for design analysis with framework assessment, consider now some example procedures to illustrate additional aspects of the techniques.

Example Procedures

This section describes example procedures for design analysis with framework assessment in one or more embodiments. Aspects of the procedures may be implemented in hardware, firmware, or software, or a combination thereof. The procedures are shown as a set of blocks that specify operations that may be performed by one or more devices, but they are not necessarily limited to the orders shown for performing the operations by the respective blocks, for the operations may be performed in other orders or in fully or partially overlapping manners. In at least some embodiments, the procedures may be performed by a suitably configured device, such as an example end-user device 104 (e.g., of at least FIG. 1) that makes use of a framework assessment module 108 or an example server device 102 (e.g., of at least FIG. 1) that makes use of a framework assessment module 108.

Figure 9:
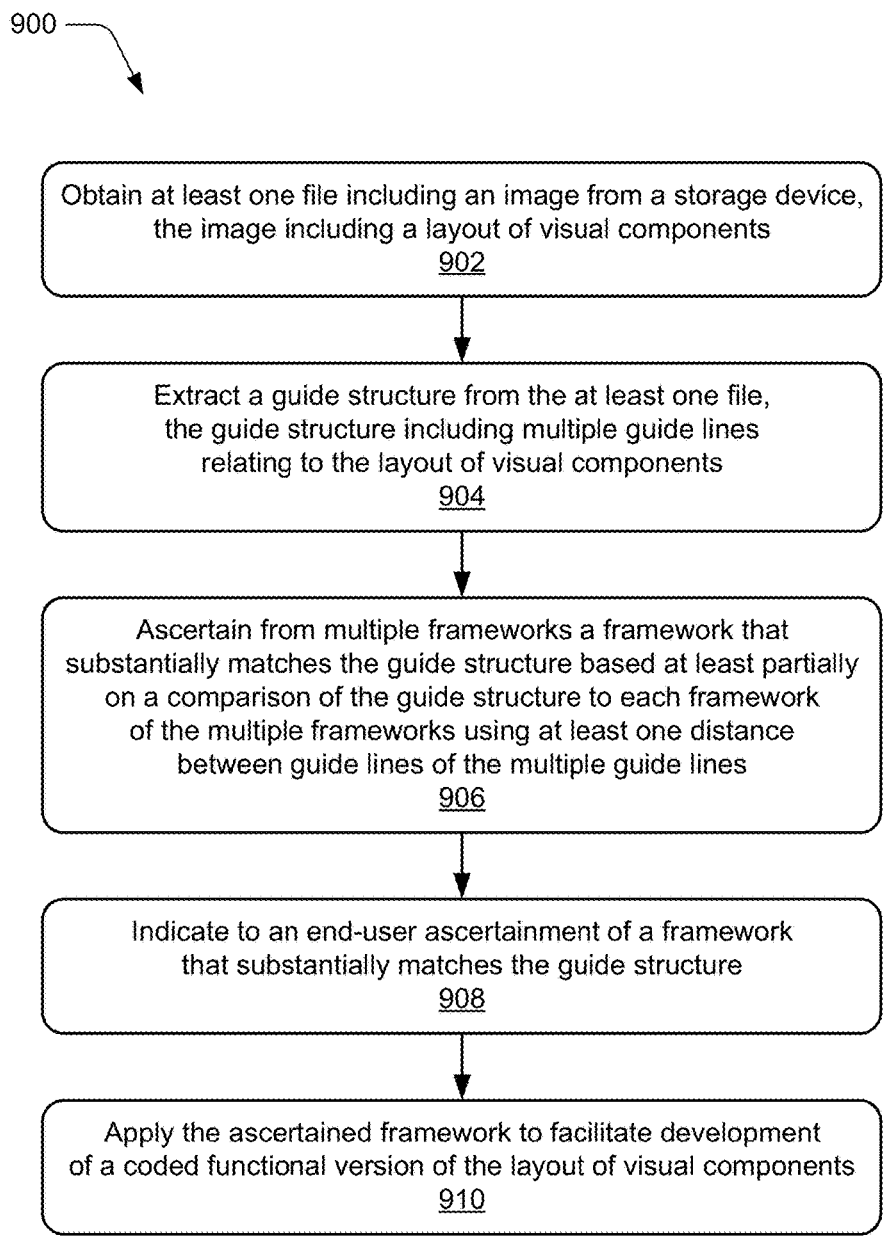
FIG. 9 is a flow diagram illustrating an example procedure in accordance with one or more example embodiments.

FIG. 9 depicts an example procedure 900 in which a framework may be ascertained that substantially matches a guide structure that is extracted from a file having an image for one or more example embodiments. At least one file including an image is obtained from a storage device, with the image including a layout of visual components (block 902). For example, a framework assessment module 108 may obtain at least one file 224 having an image 202 from hardware-based memory at a server device 102, at an end-user device 104, a combination thereof, and so forth. An image 202 may include one or more visual components 306 that are arranged in a particular layout. To effectuate an obtainment, a framework assessment module 108 may, for instance, load a file into working memory, receive a file from a remote computer, read a file from memory, retrieve a file from a remote cloud storage location, a combination thereof, and so forth, with the file comprising a designed image.

A guide structure is extracted from the at least one file, with the guide structure including multiple guide lines relating to the layout of visual components (block 904). For example, a framework assessment module 108 may apply an extraction operation 206 to at least one file 224 including a guide structure 204 having multiple guide lines 302 so as to enable analysis thereof. Multiple guide lines 302 may relate to (e.g., define, set parameters for, be based on or vice versa, indicate positioning of, or a combination thereof) a layout of visual components 306 of an associated image 202. To effectuate an extraction, a framework assessment module 108 may, for instance, extricate a guide structure 204 from a file 224, isolate a guide structure 204 from components 306 of an image 202, process image 202 such that characteristics of guide structure 204—such as distances between guide lines 302—may be analyzed, identify one or more guide lines 302 of a guide structure 204 that is part of a file 224, manipulate a file 224 that has been loaded into memory to enable determination of a spaced relationship between or among vertical lines of a picture, some combination thereof, and so forth.

From multiple frameworks, a framework that substantially matches the guide structure is ascertained based at least partially on a comparison of the guide structure to each framework of the multiple frameworks using at least one distance between guide lines of the multiple guide lines (block 906). For example, a framework assessment module 108 may ascertain a substantially matching framework 114* from among multiple frameworks 114 at least partially based on at least one comparison operation 210. A comparison operation 210 may include an attempt to match, at least after a remediation process, at least one characteristic of a layout of columns of guide structure 204 (e.g., a distance between two guide lines 302 or a width of a column 304 of guide structure 204) with at least one characteristic of a columnar layout 212 of a framework 114*. To do so, a framework assessment module 108 may, for instance, compare between guide structure 204 and frameworks 114: a total number of columns, a width of columns, a width of gutters, an overall width of an image/framework, a relative placement or order of differently-sized columns, nested columns or grids, a combination thereof, and so forth. In one or more example embodiments, the term "substantially matching," as used herein, refers to matching two or more characteristics of a guide structure or framework, matching after a remediation process is applied to values derived from a guide structure, having column widths or distances between lines that are at least similar, some combination thereof, and so forth. Example remediation processes are described herein below with particular reference to FIGS. 11-1 and 11-2.

Ascertainment of a framework that substantially matches the guide structure may be indicated to an end-user (block 908). An indication may be explicit, such as by presenting a name of an ascertained framework, with or without an opportunity to accept or decline the ascertained framework; alternatively, an indication may be implicit, such as by setting up a workspace using the ascertained framework for an end-user. For example, a framework assessment module 108 may present at least one framework indication 216 to an end-user 110, such as a person interacting with a desktop computer, a laptop computer, a tablet computer, or another end-user device 104. To do so, a framework assessment module 108 may, for instance, present a name of an ascertained framework 114* having a matching status 214, enable an end-user 110 to select a matching framework 114* for development use, display one or more characteristics of a matching framework*, graphically display a visual representation 614 of a matching framework 114* as part of a web page development workspace, a combination thereof, and so forth.

Generally, an end-user may be empowered to accept or decline an ascertained framework. For example, an end-user 110 may be given an opportunity to receive more information about a framework 114—such as a description of one or more characteristics thereof, to see a visual representation 614 of a framework 114, to utilize a framework 114 for development work, some combination thereof, and so forth. Regardless of if input is received from the end-user, the ascertained framework may be applied to facilitate development of a coded functional version of the layout of visual components (block 910). For example, if an end-user 110 requests or assents to a suggested framework 114, or if a framework is to be automatically applied, a framework assessment module 108 may load a framework 114 and prepare the framework for use to aid a developer in creating a program product that can reproduce at least an appearance of a layout of multiple components 306 of an image 202 in accordance with a designer's intentions as reflected by a guide structure 204. To do so, a framework assessment module 108 may, for instance, display a visual representation 614 of a matching framework 114*, which is employable to produce a coded functional file—such as a file using HTML or CCS, in a developer workspace window 600 to facilitate a developer transforming a designed image into a coded functional file, e.g., for a web page.

Figure 10:
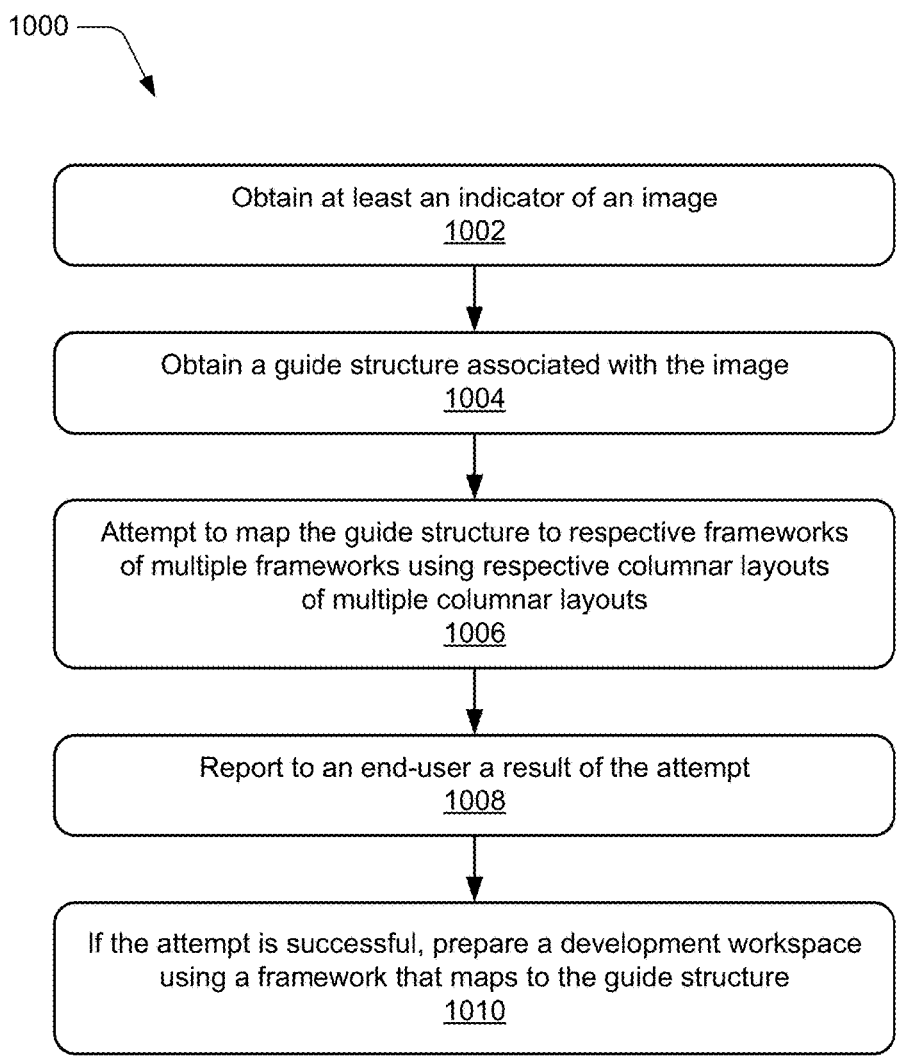
FIG. 10 is another flow diagram illustrating another example procedure in accordance with one or more example embodiments.

FIG. 10 depicts an example procedure 1000 in which an obtained guide structure for an image is attempted to be mapped to respective columnar layouts of respective frameworks of multiple frameworks for one or more example embodiments. At least an indicator of an image is obtained (block 1002). For example, a framework assessment module 108 may obtain (i) a file name or a file having an image 202 or (ii) a pointer to an image 202. To do so, a framework assessment module 108 may, for instance, receive a uniform resource identifier (URI)—such as a uniform resource locator (URL) for a file, process an uploaded file, retrieve a file from the cloud or a local drive, accept user input identifying a file name, interpret an end-user's click or finger touch as identifying an image, some combination thereof, and so forth.

A guide structure associated with the image is obtained (block 1004). For example, a framework assessment module 108 may obtain a guide structure 204 that is associated with (e.g., is integrated with, is linked to, is used to design or make, reflects a layout of visual components of, a combination thereof) image 202. To do so, a framework assessment module 108 may, for instance, extract guide structure 204 from image 202, receive guide structure 204 from a remote source, load guide structure 204 from an identified file, some combination thereof, and so forth.

Mapping of the guide structure to respective frameworks of multiple frameworks using respective columnar layouts of multiple columnar layouts is attempted (block 1006). For example, a framework assessment module 108 may try to match different columnar layouts 212 of respective different frameworks 114 to a layout of columns derived from guide structure 204. To do so, a framework assessment module 108 may, for instance, compare column-related characteristics determined from guide lines 302 of guide structure 204 to column numbers, column widths, gutter widths, relative column positions, grid blueprints, a combination thereof, etc. of different columnar layouts 212 to attempt to ascertain a matching framework 114*.

A result of the attempting may be reported to an end-user (block 1008). For example, a framework assessment module 108 may report to a local or a remote end-user 110 an inability to find a match or an identity of a framework 114 that was mapped to guide structure 204 of image 202. To do so, a framework assessment module 108 may, for instance, present an aural or visual indication of "no match found" to a local end-user 110, cause a browser to display a name of a matching framework 114* to a remote end-user 110, present a visual representation of a matching framework 114* on a screen of a device, some combination thereof, and so forth.

If the attempting is successful, a development workspace may be prepared using a framework that maps to the guide structure (block 1010). For example, if a framework 114* that maps to a guide structure 204 is successfully found or identified, a framework assessment module 108 may create for an end-user 110 a development workspace 600 that uses the framework 114* that is mapped to guide structure 204. For instance, at least a portion of a framework may be retrieved from a remote location and installed or loaded or activated locally. Additionally or alternatively, a set of columns with a particular spacing or number or gutter widths, with a particular grid arrangement, a combination thereof, etc. may be displayed visually or pre-loaded with supporting foundational code for an end-user to start developing a coded functional version of an image 202 from which guide structure 204 was extracted.

Figures 1, 11:
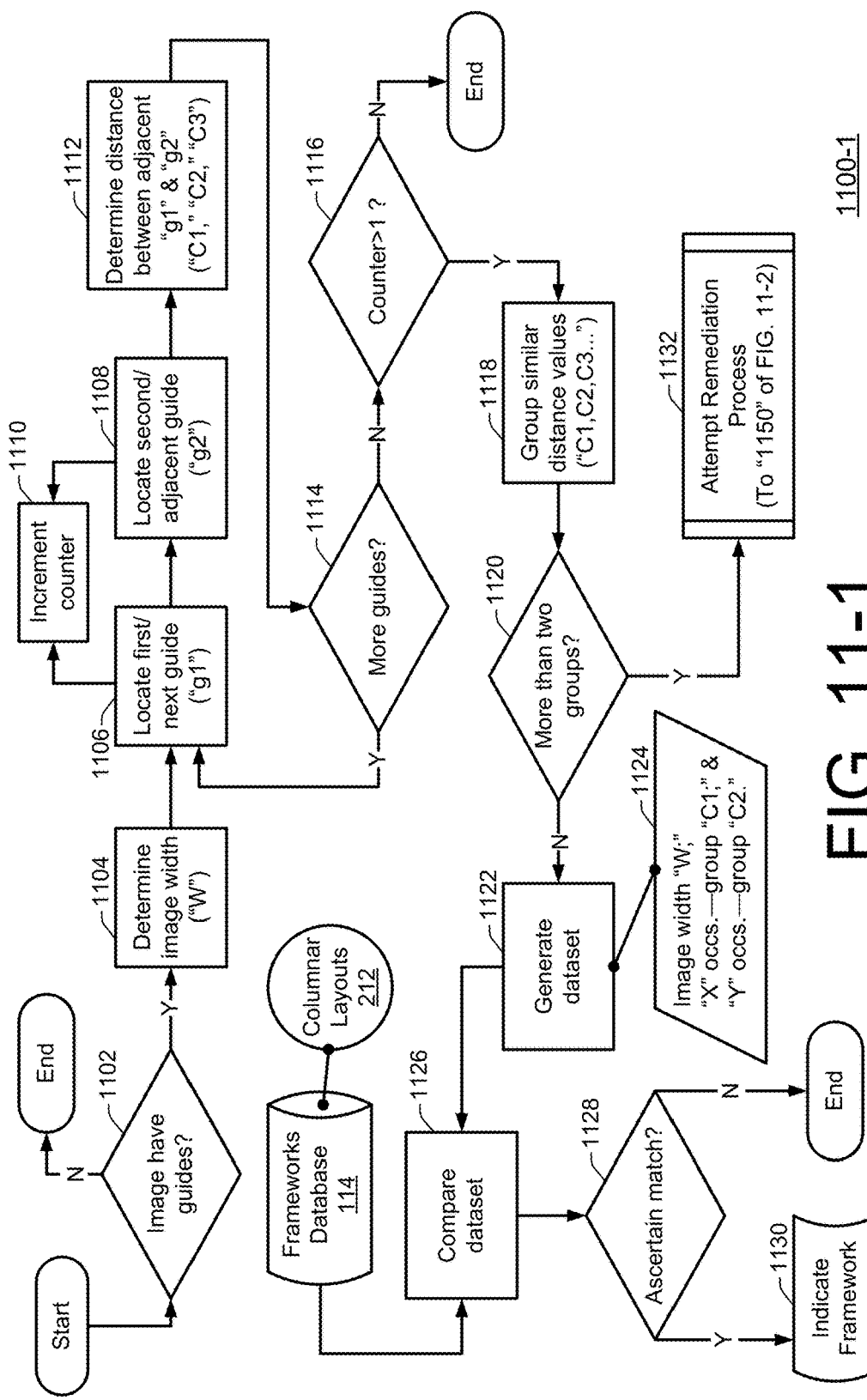
Figures 2, 11:
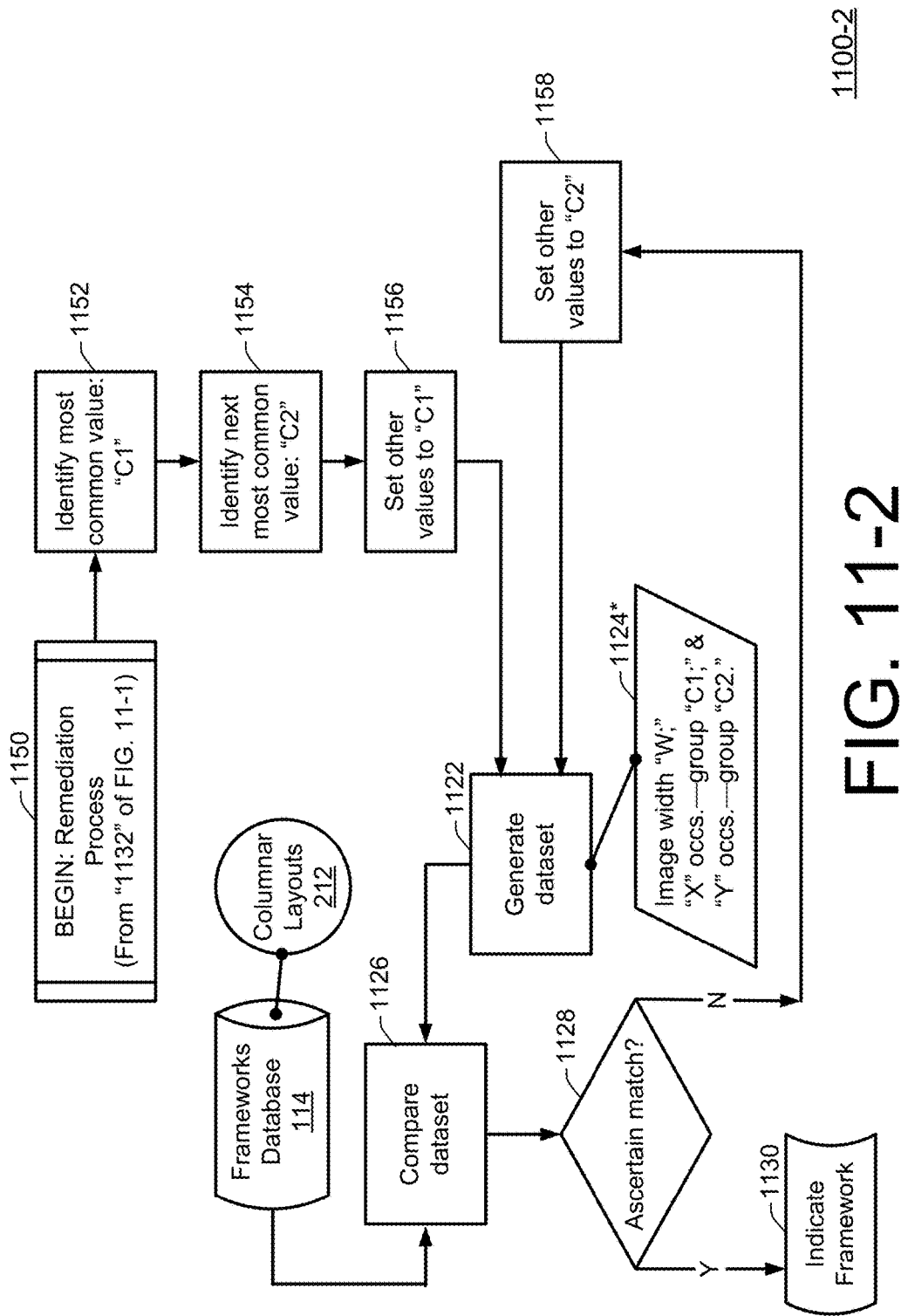

FIGS. 11-1 and 11-2 are flow charts 1100-1 and 1100-2, respectively, illustrating example processes in accordance with one or more example embodiments. By way of example only, the processes of flow charts 1100-1 or 1100-2 may be implemented by at least one framework assessment module 108 (e.g., of at least FIGS. 1 and 2). At block 1102, it is determined if an image includes any design guide lines (e.g., by inspecting a file including image). If not, the process ends. If so, then at block 1104 an image width ("W") is determined. At block 1106, a first guide ("g1") is located. At block 1108, a second guide ("g2") is located. After blocks 1106 and 1108 a counter is incremented at block 1110. At block 1112, a distance between adjacent (e.g., first and second) guides ("g1" and "g2") is determined (e.g., to attain a column width "C1," "C2," "C3," etc.). The distance may comprise, for example, at least a relative distance, such as fractional or percentages of a total width, mm or inches, a number of pixels, em, a number of points, a combination thereof, and so forth.

At block 1114, it is determined if there are more guide lines for analysis. If so, the process of flow chart 1100-1 continues by repeating blocks 1106, 1108, and 1112, as well as block 1110. At block 1106, a next guide (another "g1") is located, and an adjacent guide (another "g2") is located at block 1108. For this execution of block 1112, another distance between adjacent guides is determined (e.g., another instance of a column width "C1," "C2," "C3," etc.). Eventually, it may be determined at block 1114 that there are no more guides to analyze. At block 1116, a value of the counter is inspected. If it is not greater than one, the process ends. If the counter is greater than one, then at block 1118 similar distance values (e.g., for column widths "C1," "C2," "C3," etc.) are grouped together. In this context, a group of column widths may correspond to a guard zone or gutter as well as columns that are allocated for content. In one or more example embodiments, the terms "similar distance values" or "similar distances" or "similar widths," as used herein, refers to distances or widths that are equal, that are no more than 1-3 pixels apart, that are separated by 5% or less, some combination thereof, and so forth.

The process of flow charts 1100-1 and 1100-2 may be utilized to attempt to map a guide structure of an image to a framework having two different column widths, or vice versa. At block 1120, it is determined if more than two groups resulted from the grouping of block 1118. If so, then at block 1132 a remediation process is attempted to handle one or more outlying values; an example remediation process is shown in FIG. 11-2. If more than two groups do not result from the grouping (as determined at block 1120), then at block 1122 a dataset is generated. A dataset may correspond, for instance, to a columnar layout for a designed image. A dataset 1124 may include, for example, an image width "W," "X" number of occurrences for a group having a column width of "C1," and "Y" number of occurrences for a group having a column width of "C2."

At block 1126, dataset 1124 is compared to respective columnar layouts 212 of respective frameworks from frameworks database 114. If a match is ascertained between dataset 1124 and at least one columnar layout 212 as detected at block 1128, then the framework corresponding to the matching columnar layout is indicated to an end-user at block 1130. Otherwise, the process ends.

As discussed above and as indicated at block 1132, if more than two groups are detected at block 1120, a remediation process may be executed to try to correct an error in guide line placement by the image designer (e.g., if frameworks to be compared have but two different column widths). Continuing with FIG. 11-2, the flow chart of 1100-2 illustrates an example remediation process, which begins at block 1150. At block 1152, the most common value is identified, which is "C1" here (e.g., there are more occurrences of a distance of "C1"). At block 1154, the next most common value is identified, which is "C2" here (e.g., there are fewer occurrences of a distance of "C2" as compared to the number of occurrences of a distance of "C1"). At block 1156, one or more other values (e.g., one that is a distance for a third "C3" group—as detected at block 1120 of FIG. 11-1), ones termed outlier values herein, are set to the most common value, which is the distance of the "C1" group here.

At block 1122, a new dataset is generated. A newly-generated dataset 1124* includes an outlier value assigned to group "C1," which increases a number of occurrences "X," to determine if the designer may have intended the outlier value to belong to group "C1." Blocks 1126, 1128, and 1130 of flow diagram 1100-2 are performed similarly to blocks 1126, 1128, and 1130 of flow diagram 1100-1. After block 1128 if a match is not ascertained, then at block 1158, one or more other outlier values (e.g., one that is a distance for a third "C3" group—as detected at block 1120 of FIG. 11-1) are set to the next most common value, which is the distance of the "C2" group here. At block 1122, a different dataset is generated. A different generated dataset 1124* includes an outlier value assigned to group "C2," which increases a number of occurrences "Y," to determine if the designer may have intended the outlying value to belong to group "C2."

The process then continues to attempt to ascertain a matching framework at blocks 1126, 1128, and 1130.

As described above, an outlier value (e.g., a value for which there is but one or a few occurrences that number less than the total occurrences for other groups) may be addressed by assigning an outlying column value to one or more groups based on frequency of occurrence and then looking for a framework match. However, other approaches to remediation may alternatively be implemented. By way of example only, an outlying (e.g., single) column width may be assigned to a column group having a width value that is closest to the outlying column width, regardless of frequency of occurrence. For instance, outlying values of 93 and 98 pixels may be assigned (e.g., rounded) to a column group having a width of 97 pixels with 10 occurrences instead of a column group having a width of 15 pixels with 24 occurrences. As another example, an outlying column width may be assigned to column group(s) in an order of increasing width value of the group(s) until a framework match is ascertained. If there are multiple outlying values, different permutations or assignments of outlying values to one or more groups of column widths may be tried until a framework match is ascertained.

Having described example procedures in accordance with one or more embodiments, consider now an example system and device that can be utilized to implement the various techniques described herein.

Example System and Device

Figure 12:
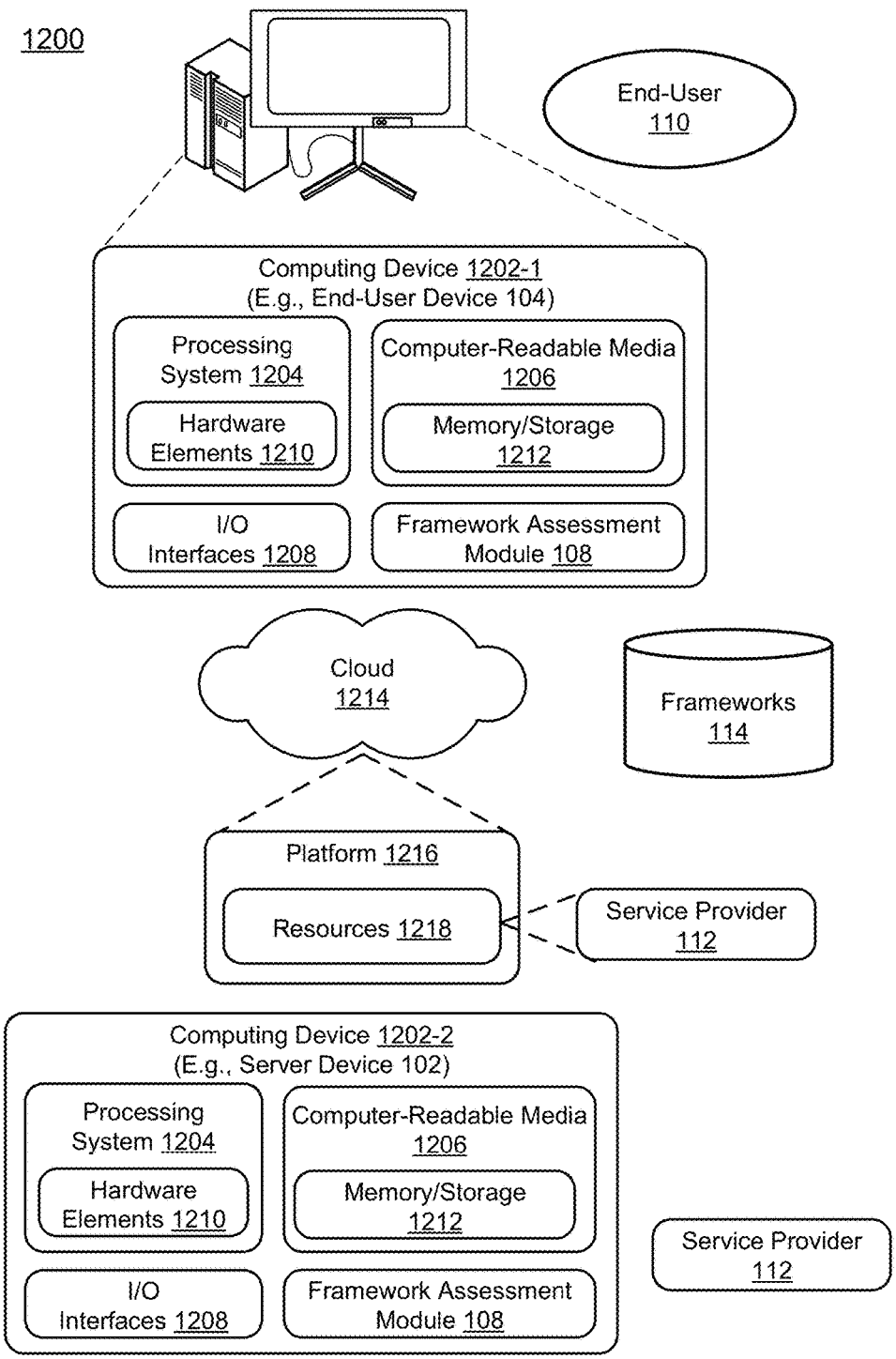
FIG. 12 illustrates an example system including various components of example devices that can be employed for one or more embodiments of design analysis for framework assessment as described herein.

FIG. 12 illustrates an example system generally at 1200 that includes example computing devices 1202 that are representative of one or more computing systems or computing devices that may implement the various techniques described herein. This is illustrated through inclusion of two framework assessment modules 108, either or both of which may operate as described herein above, as well as multiple frameworks 114. A computing device 1202 may comprise, for example, a server device 102 of a service provider 112, an end-user device 104 (e.g., a client device) of an end-user 110, an on-chip system or system-on-a-chip (SOC), or any other suitable computing device or computing system. An example end-user device 104 is represented by computing device 1202-1, and an example server device 102 is represented by computing device 1202-2.

Example computing devices 1202 as illustrated include at least one processing system 1204, one or more computer-readable media 1206, and one or more I/O interfaces 1208 that may be communicatively coupled, one to another. Although not explicitly shown, each computing device 1202 may further include a system bus or other data and command transfer system that couples the various components, one to another. A system bus can include any one or combination of different bus structures, such as a memory bus or memory controller, a peripheral bus, a universal serial bus, or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including hardware elements 1210 that may be configured as processors, functional blocks, and so forth. This may include implementation in hardware as an application specific integrated circuit (ASIC) or other logic device formed using e.g. one or more semiconductors. The hardware elements 1210 are not limited by the materials from which they are formed or the processing mechanisms employed therein. For example, processors may be comprised of semiconductor(s) or transistors (e.g., electronic integrated circuits (ICs)). In such a context, processor-executable instructions may comprise electronically-executable instructions.

The computer-readable storage media 1206 is illustrated as including memory/storage 1212. The memory/storage 1212 represents memory/storage capacity associated with one or more computer-readable media. The memory/storage component 1212 may include volatile media (such as random access memory (RAM)) or nonvolatile media (such as read only memory (ROM), flash memory, optical discs, magnetic disks, etc.). The memory/storage component 1212 may include fixed media (e.g., RAM, ROM, or a fixed hard drive) or removable media (e.g., flash memory, a removable hard drive, or an optical disc). The computer-readable media 1206 may be configured in a variety of other ways as further described below.

Input/output interface(s) 1208 are representative of functionality to allow a user to enter commands or information to computing device 1202 or to allow information to be presented to the user, or other components or devices using various input/output devices. Examples of input devices include a keyboard, a cursor control device (e.g., a mouse or touchpad), a microphone, a scanner, touch functionality (e.g., capacitive, resistive, or other sensors that are configured to detect physical touch), a camera (e.g., which may employ visible or non-visible wavelengths such as infrared frequencies to recognize movement as gestures that need not involve touch), a combination thereof, and so forth. Examples of output devices include a display device (e.g., an LCD or LED screen, a monitor, or a projector), a speaker, a printer, a network card, a haptic-response device, a combination thereof, and so forth. Thus, the computing device 1202 may be configured in a variety of ways as further described below to support local or remote user interaction.

Various techniques may be described herein in the general context of software, hardware elements, or program modules. Generally, such modules may include routines, programs, objects, elements, components, data structures, combinations thereof, and so forth that perform particular tasks or implement particular abstract data types. The terms "module," "functionality," and "component" as used herein generally represent software, firmware, hardware, or a combination thereof. The features of the techniques described herein may be platform-independent, meaning that the described techniques may be implemented on a variety of commercial computing platforms having a variety of processors.

An embodiment of the described modules, and techniques thereof, may be stored on or transmitted across some form of computer-readable media. The computer-readable media may include a variety of media that may be accessed by the computing device 1202. By way of example, and not limitation, computer-readable media may include "computer-readable storage media" and "computer-readable signal media."

"Computer-readable storage media," as used herein, refers to media or devices that enable persistent and/or non-transitory storage of information in contrast to mere signal transmission, carrier waves, or signals per se. Computer-readable storage media does not include signals per se or signal bearing media. The computer-readable storage media includes hardware such as volatile and non-volatile, removable and non-removable media or storage devices implemented in a process or technology suitable for storage of information, such as computer readable instructions, data structures, program modules, logic elements/circuits, or other data. Examples of computer-readable storage media may include, but are not limited to, RAM, ROM, EEPROM, flash memory, or other e.g. solid state memory technology; CD-ROM, digital versatile discs (DVD), or other optical storage; hard disks, magnetic cassettes, magnetic tape, magnetic disk storage, or other magnetic storage devices; or other storage device, tangible media, article of manufacture, or combination thereof that is suitable to store desired information and that may be accessed by a computer.

"Computer-readable signal media," as used herein, refers to a signal-bearing medium that is configured to transmit instructions to hardware of the computing device 1202, such as via a network. Computer-readable signal media typically may embody computer readable instructions, data structures, program modules, or other data in a modulated data signal, such as carrier waves, data signals, or other transport mechanism. Computer-readable signal media may also include any information delivery media. The term "modulated data signal" means a signal that has one or more of its characteristics set or changed in such a manner as to encode information in the signal. By way of example, but not limitation, computer-readable signal media may include wired media, such as a wired network or direct-wired connection, and wireless media such as acoustic, RF, microwave, infrared, or other wireless media.

As previously described, hardware elements 1210 and computer-readable media 1206 may be representative of modules, programmable device logic, fixed device logic, a combination thereof, and so forth that is implemented in a hardware form that may be employed in some embodiments to implement at least some aspects of the techniques described herein, such as to perform one or more instructions or computing actions. Hardware may include components of an integrated circuit (IC) or on-chip system, an application-specific integrated circuit (ASIC), a field-programmable gate array (FPGA), a complex programmable logic device (CPLD), or other implementations in silicon or other hardware. In this context, hardware may operate as a processing device that performs program tasks defined by instructions or logic embodied by the hardware as well as hardware utilized to store instructions for execution, e.g., the computer-readable storage media described previously.

Combinations of the foregoing may also be employed to implement various techniques described herein. Accordingly, software, hardware, or executable modules may be implemented as one or more instructions or logic embodied on some form of computer-readable storage media or by one or more hardware elements 1210. The computing device 1202 may be configured to implement particular instructions or functions corresponding to software or hardware modules. Accordingly, implementation of a module that is executable by the computing device 1202 as software may be achieved at least partially in hardware, e.g., through use of computer-readable storage media or the hardware elements 1210 of the processing system 1204. The instructions or functions may be executable/operable by one or more articles of manufacture (e.g., one or more computing devices 1202 or processing systems 1204) to implement techniques, modules, or examples described herein.

The techniques described herein may be supported by various configurations of the computing device 1202 and are not limited to the specific aspects of the example devices described herein. This functionality may also be implemented fully or partially through use of a distributed system, such as over a "cloud" 1214 via a platform 1216 as described below.

The cloud 1214 may include or represent a platform 1216 for resources 1218. The platform 1216 abstracts underlying functionality of hardware (e.g., servers or data centers) and software resources of the cloud 1214. The resources 1218 may include applications or data that can be utilized while computer processing is at least partially executed on servers that are remote from, or distributed around, the computing device 1202. Resources 1218 may also include services provided over the Internet or through a subscriber network, such as a cellular or Wi-Fi network.

The platform 1216 may abstract resources and functions to connect the computing device 1202 with other computing devices. The platform 1216 may also serve to abstract scaling of resources to provide a corresponding level of scale to encountered demand for the resources 1218 that are implemented via the platform 1216. Accordingly, in an interconnected device embodiment, implementation of functionality described herein may be distributed throughout the system 1200, or at least throughout the cloud 1214 along with a computing device 1202, such as the computing device 1202-2. For example, functionality may be implemented in part on a computing device 1202 as well as via the platform 1216 that abstracts the functionality of the cloud 1214.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A device comprising:
one or more hardware processors; and
a computer-readable storage medium having stored thereon multiple instructions that, responsive to execution by the one or more processors, cause the one or more processors to implement a framework assessment module configured to perform operations comprising:
obtaining at least one file including an image from a storage device, the image including a layout of one or more visual components;
extracting a guide structure from the at least one file, the guide structure including a distance between guide lines relating to the layout of the one or more visual components;
ascertaining a framework from multiple frameworks as having a match status with the guide structure based on a comparison of the guide structure to each framework of the multiple frameworks using the distance between the guide lines, the framework comprising code to produce a coded functional version;
facilitating development of the at least one file into the coded functional version using the ascertained framework, the facilitating including automatically applying the ascertained framework as part of developing the coded functional version of the layout of the one or more visual components.

2. The device as described in claim 1, wherein the facilitating comprises presenting a workspace for building the coded functional version, the workspace including a display of a visual representation of the ascertained framework.

3. The device as described in claim 1, wherein the ascertaining comprises determining multiple distances between multiple pairs of adjacent guide lines of the guide lines of the guide structure extracted from the at least one file.

4. The device as described in claim 3, wherein the ascertaining further comprises organizing the multiple distances into at least two groups based on sizes of the multiple distances.

5. The device as described in claim 4, wherein the ascertaining further comprises performing a remediation process by assigning an outlying distance value corresponding to a distance between a pair of adjacent guide lines to a group of the at least two groups.

6. A computer-implemented method comprising:
loading at least one file including an image from a storage device;
extracting a guide structure from the at least one loaded file, the guide structure associated with the image and indicating a distance between guide lines;
ascertaining a framework, from multiple frameworks, that has a match status with the guide structure based on a comparison of the guide structure to each framework of the multiple frameworks;
indicating that the ascertained framework has the match status with the guide structure;
receiving an indication to accept or decline the ascertained framework; and
facilitating development of the at least one file into a coded functional file using code contained by the ascertained framework, the facilitating including automatically applying the ascertained framework as part of developing the coded functional file.

7. The computer-implemented method as described in claim 6, wherein:
the guide structure comprises multiple vertical guide lines; and
the extracting includes extracting the multiple vertical guide lines from the at least one loaded file.

8. The computer-implemented method as described in claim 7, wherein the extracting further comprises:
extracting relative horizontal distances between or among the multiple vertical guide lines.

9. The computer-implemented method as described in claim 6, wherein the ascertaining comprises:
comparing a first columnar layout associated with the guide structure to a second columnar layout associated with each framework of the multiple frameworks.

10. The computer-implemented method as described in claim 9, wherein the first columnar layout comprises a first total number of columns, and the second columnar layout comprises a second total number of columns; and wherein the comparing comprises:
comparing the first total number of columns associated with the guide structure to the second total number of columns associated with each framework of the multiple frameworks.

11. The computer-implemented method as described in claim 9, wherein the first columnar layout comprises a first relative positioning of columns, and the second columnar layout comprises a second relative positioning of columns; and wherein the comparing comprises:
comparing the first relative positioning of columns associated with the guide structure to the second relative positioning of columns associated with each framework of the multiple frameworks.

12. The computer-implemented method as described in claim 6, wherein the indicating comprises:
presenting a name representative of the ascertained framework.

13. The computer-implemented method as described in claim 6, wherein the facilitating is performed responsive to receiving an indication to accept the ascertained framework.

14. A device comprising:
one or more hardware processors; and
a non-transitory storage medium having stored thereon multiple instructions that, responsive to execution by the one or more processors, cause the one or more processors to perform operations comprising:
obtaining an indicator of an image;
obtaining a guide structure associated with the image, the guide structure indicating a distance between guide lines;
mapping the guide structure to respective frameworks of multiple frameworks using respective columnar layouts of multiple columnar layouts;
responsive to the mapping resulting in a match status, preparing a development workspace using a framework that maps to the guide structure; and
facilitating development of a coded functional file using code of the framework, the facilitating including automatically applying the framework as part of developing the coded functional file.

15. The device as described in claim 14, wherein the mapping comprises comparing a number of columns of the guide structure to respective numbers of columns of the respective columnar layouts of the multiple columnar layouts.

16. The device as described in claim 14, wherein the mapping includes mapping at least relative widths of columns of the guide structure to respective relative widths of columns of the respective columnar layouts of the multiple columnar layouts.

17. The device as described in claim 16, wherein the mapping at least relative widths of columns comprises comparing (i) widths of columns in pixels and widths of gutters in pixels of the guide structure to (ii) respective widths of columns in pixels and respective widths of gutters in pixels of the respective columnar layouts of the multiple columnar layouts.

18. The device as described in claim 14, wherein the mapping comprises comparing a columnar layout of the guide structure to respective grid blueprints of the respective columnar layouts of the multiple columnar layouts.

19. The device as described in claim 14, wherein the mapping comprises remedying an outlier value for a width between two adjacent guide lines of the guide structure associated with the image by adjusting the outlier value and re-attempting to map the guide structure to respective frameworks of the multiple frameworks.

20. The device as described in claim 14, wherein the indicator of the image is a file name or a pointer to an image.

* * * * *

UNITED STATES PATENT AND TRADEMARK OFFICE
CERTIFICATE OF CORRECTION

PATENT NO. : 10,178,149 B2  
APPLICATION NO. : 14/712588  
DATED : January 8, 2019  
INVENTOR(S) : Jonathan Joshua Pimento Page 1 of 1

It is certified that error appears in the above-identified patent and that said Letters Patent is hereby corrected as shown below:

On the Title Page

Item (54), and in the Specification, Column 1, delete "Analysis for framework assessment", insert -- Design Analysis for Framework Assessment --, therefor Item (57), In the Abstract, delete Lines 1-3, "Design analysis for framework assessment is described. A file including a designed image may be obtained from a storage device, and a guide structure may be extracted from the file.", insert -- Design analysis for framework assessment is described. In one or more example embodiments, a file including a designed image may be obtained from a storage device, and a guide structure may be extracted from the file --.

In the Claims

Column 20, Line 55, after "comprising code to produce a coded functional version;", insert -- and --, therefor.

Signed and Sealed this  
Sixteenth Day of April, 2019

Andrei Iancu  
*Director of the United States Patent and Trademark Office*